US012252930B1

(12) United States Patent
Gaines

(10) Patent No.: US 12,252,930 B1
(45) Date of Patent: Mar. 18, 2025

(54) WINDOW VENT ASSEMBLY

(71) Applicant: Robert G. Gaines, Howell, MI (US)

(72) Inventor: Robert G. Gaines, Howell, MI (US)

( * ) Notice: Subject to any disclaimer, the term of this patent is extended or adjusted under 35 U.S.C. 154(b) by 0 days.

(21) Appl. No.: 18/751,220

(22) Filed: Jun. 22, 2024

(51) Int. Cl.
*E06B 7/02* (2006.01)
*E06B 7/10* (2006.01)

(52) U.S. Cl.
CPC . *E06B 7/10* (2013.01); *E06B 7/02* (2013.01)

(58) Field of Classification Search
CPC ..... E06B 7/26; E06B 7/03; E06B 7/02; E06B 7/04; E06B 7/08; E06B 7/082; E06B 7/084; E06B 7/086; E06B 7/088; E06B 7/098; E06B 7/10; E06B 7/12; E06B 2009/527
See application file for complete search history.

(56) References Cited

U.S. PATENT DOCUMENTS 5,137,492 A * 8/1992 Archer ...................... E06B 7/02 454/226
6,558,247 B1 * 5/2003 Peak ...................... F24F 13/28 454/213
2007/0042703 A1 * 2/2007 Lee ...................... E06B 7/02 454/213
2014/0113541 A1 * 4/2014 Drier ...................... E06B 7/02 454/314

FOREIGN PATENT DOCUMENTS

WO WO-2016085340 A2 * 6/2016 ............... E06B 7/02

* cited by examiner

*Primary Examiner* — Kyle J. Walraed-Sullivan
(74) *Attorney, Agent, or Firm* — Carlson, Gaskey & Olds, P.C.

(57) ABSTRACT

A window vent assembly has a lower frame assembly and an upper frame assembly. The lower frame assembly has a horizontal plate portion, a first vertical plate portion, and a slanted plate portion. The first vertical plate portion is coupled to a second end of the horizontal plate portion and extends upwardly therefrom. The slanted plate portion extends from a first end of the horizontal plate portion to a top portion of the first vertical plate portion. The upper frame assembly has a horizontal wall portion and first and second vertical wall portions. The first vertical wall portion extends downwardly and forms an air gap between the first vertical wall portion and the slanted plate portion. The second vertical wall portion extends downwardly and forms another air gap between the second vertical wall portion and the slanted plate portion.

14 Claims, 20 Drawing Sheets

WINDOW VENT ASSEMBLY

BACKGROUND

Building codes require forced ventilation for any habitable space which utilizes an external exhaust duct and fresh air duct. Each of these ducts are connected to an outdoor hood or louver. These outdoor hoods and louvers are unattractive and in some locations not even allowed due to local architectural requirements.

The inventor herein has recognized a need for a new window vent assembly that provides forced ventilation venting without the need for outdoor hoods and louvers as part of a window assembly.

SUMMARY

A window vent assembly in accordance with an exemplary embodiment is provided. The window vent assembly includes a lower frame assembly having a horizontal plate portion, a first vertical plate portion, and a slanted plate portion. The horizontal plate portion has a first end and a second end. The first vertical plate portion is coupled to the second end of the horizontal plate portion and extends upwardly from the horizontal plate portion. The slanted plate portion is coupled to and extends from the first end of the horizontal plate portion to a top end of the first vertical plate portion. The window vent assembly further includes an upper frame assembly having a horizontal wall portion, a first vertical wall portion, and a second vertical wall portion. The first vertical wall portion is coupled to and extends downwardly from a first end of the horizontal wall portion such that a first air gap is formed between the first vertical wall portion and the slanted plate portion. The second vertical wall portion is coupled to and extends downwardly from a second end of the horizontal wall portion such that a second air gap is formed between the second vertical wall portion and the slanted plate portion.

DETAILED DESCRIPTION

Referring to FIGS. 1-5, a window frame 20, a window pane 22, a window vent assembly 30 in accordance with an exemplary embodiment, and a portion of the wall 40 are illustrated. An advantage of the window vent assembly 30 is that the assembly 30 can be mounted on a top portion of a fixed pane window frame to allow air flow into and out of a building.

Window Frame

Figure 1:
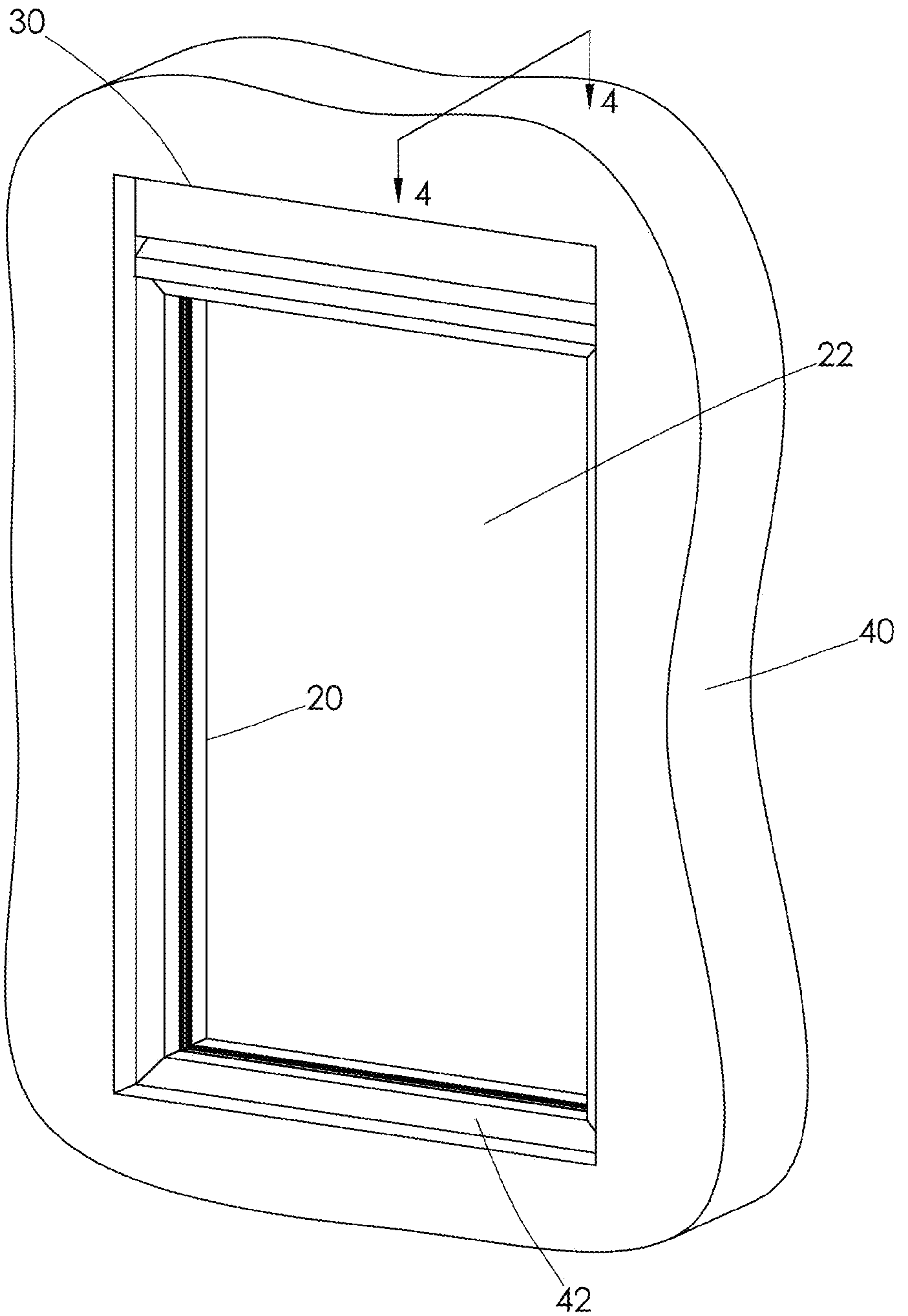
FIG. 1 is an isometric outside view of a window frame, a window pane, a window vent assembly in accordance with an exemplary embodiment, and a portion of a wall.
Figure 2:
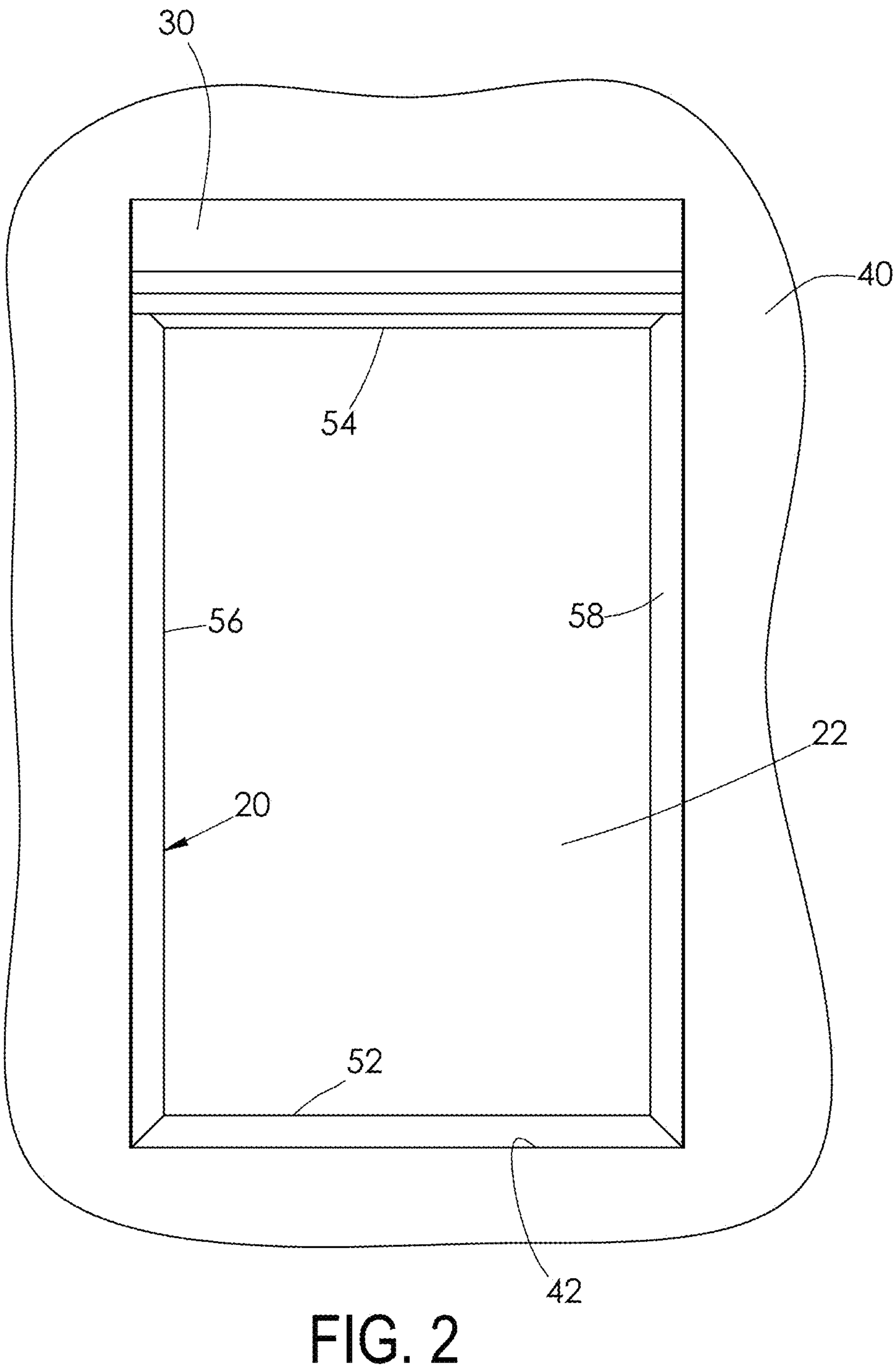
FIG. 2 is a front outside view of the window frame, the window pane, the window vent assembly, and the portion of the wall of FIG. 1.
Figure 3:
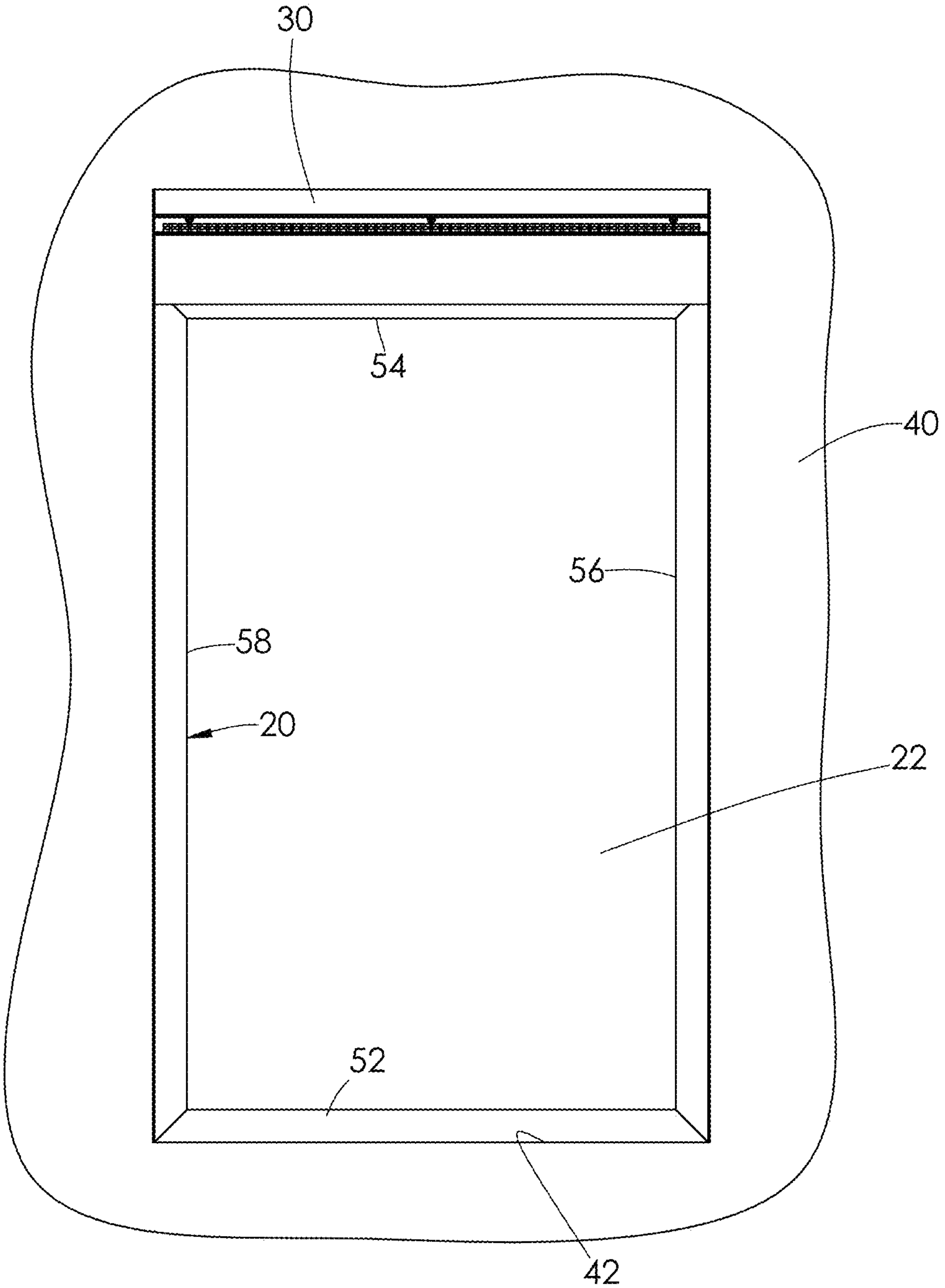
FIG. 3 is a rear inside view of the window frame, the window pane, the window vent assembly, and the portion of the wall of FIG. 1.
Figure 4:
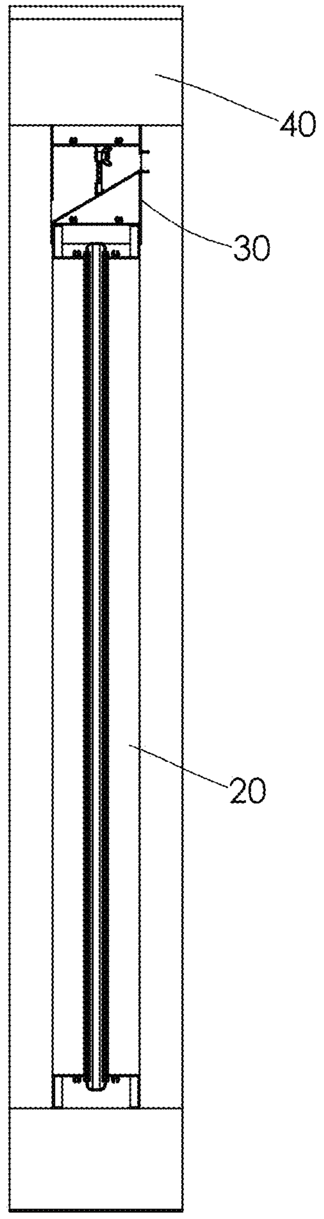
FIG. 4 is a cross-sectional view of the window frame, the window pane, the window vent assembly, and the portion of the wall of FIG. 1 taken along lines 4-4 in FIG. 1.

Referring to FIGS. 1-3, the window frame 20 is provided to hold the window pane 22 therein. The window frame 20 is disposed within the opening 42 of the wall 40 and is coupled to the wall 40. The window frame 20 has a lower window frame portion 52, an upper frame portion 54, a first side frame portion 56, and a second side frame portion 58. The first and second side frame portions 56, 58 extend parallel to one another. The lower window frame portion 52 and the upper frame portion 54 extend parallel to one another and are coupled to the first and second side frame portions 56, 58. In an exemplary embodiment, the window frame 20 is constructed of a metal such as aluminum for example.

Window Vent Assembly

Referring to FIGS. 1 and 5-10, the window vent assembly 30 is provided to route outside air through a first air gap 141, an interior region 145, and a second air gap 142 into an interior of a building and vice versa. The window vent assembly 30 is coupled to a top portion of the window frame 20 and to the wall 40 within the opening 42. The window vent assembly 30 includes a lower frame assembly 70, an upper frame assembly 72, a first side plate 81, a second side plate 82, first, second, third, fourth, fifth, sixth, seventh, eighth screws 101, 102, 103, 104, 105, 106, 107, 108, an insect screen assembly 110, first, second, third bolts 121, 122, 123, first, second, third wingnuts 131, 132, 133, a first air gap 141, and a second air gap 142. In an exemplary embodiment, the lower frame assembly 70, the upper frame assembly 72, the first side plate 81, the second side plate 82, and the insect screen assembly 110 are each constructed of a metal such as aluminum or steel for example.

Lower Frame Assembly

Referring to FIGS. 5, 8 and 12-14, the lower frame assembly 70 is disposed on and coupled to the upper frame portion 54 of the window frame 50. The lower frame assembly 70 includes a horizontal plate portion 150, first, second, third, and fourth vertical plate portions 161, 162, 163, 164, a slanted plate portion 166, a water blocking plate portion 168, a horizontal duct connection flange 171, first and second arcuate-shaped screw guides 181, 182, a screen receiving gap 184, a first side 191 (shown in FIG. 12), and a second side 192 (shown in FIG. 13).

Figure 5:
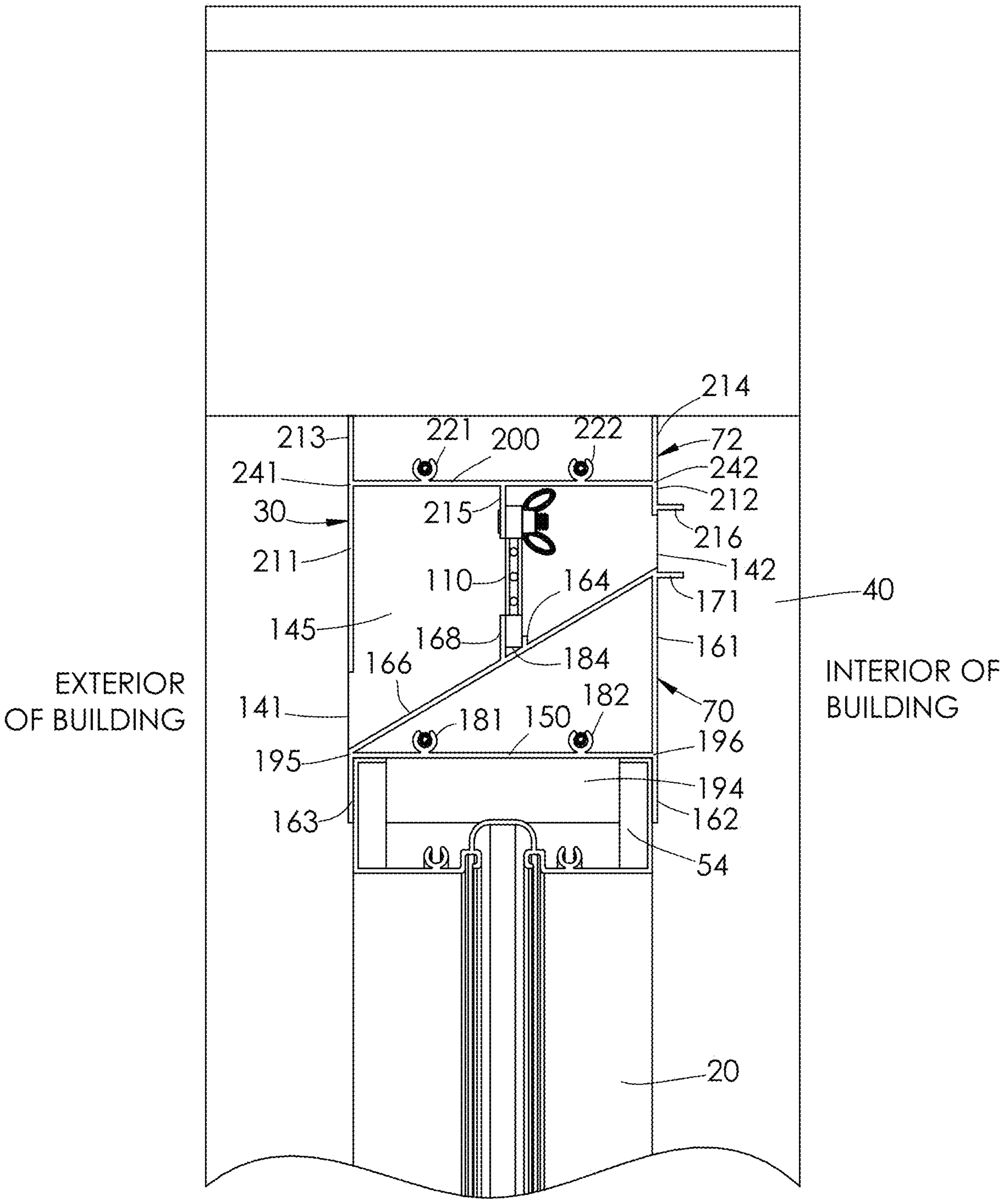
FIG. 5 is an enlarged view of a top portion of the cross-sectional view of FIG. 4.
Figure 6:
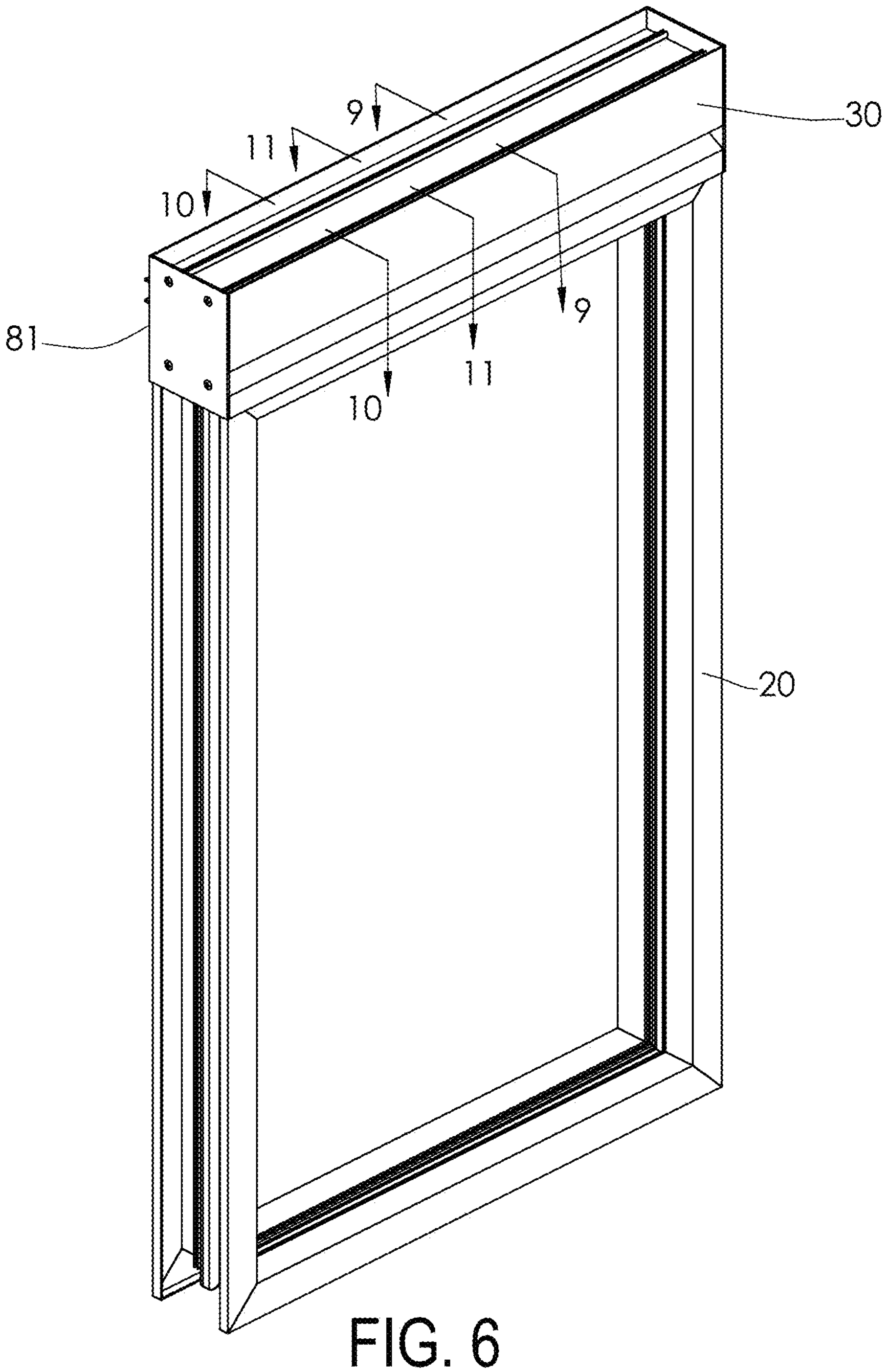
FIG. 6 is an isometric outside view of the window frame and the window vent assembly of FIG. 1.
Figure 7:
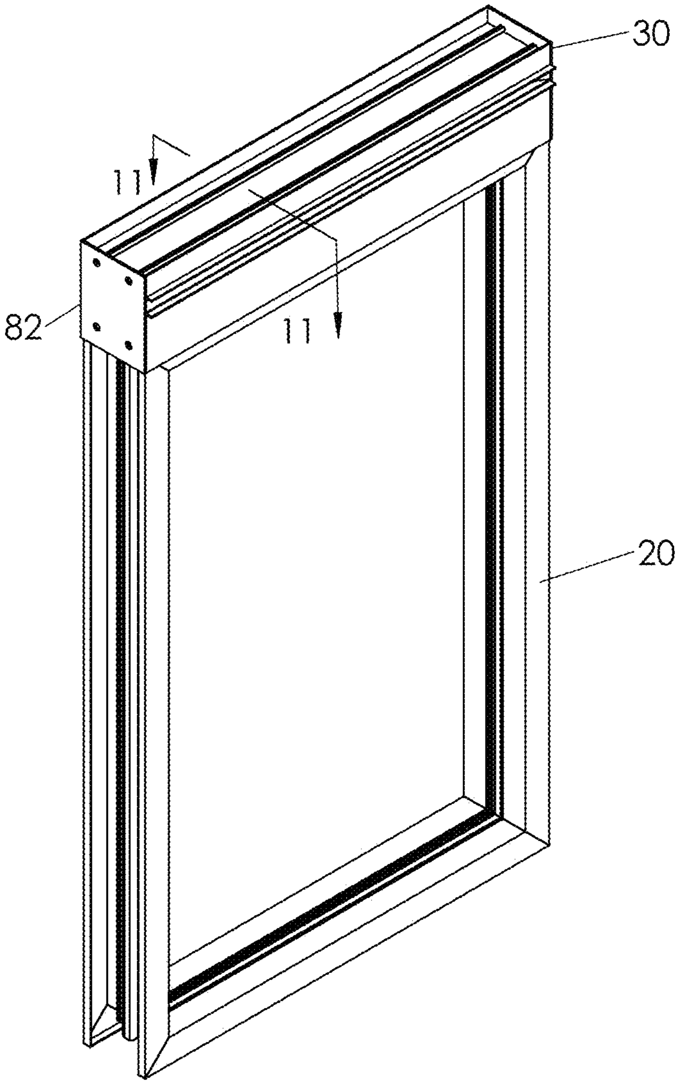
FIG. 7 is an isometric inside view of the window frame and the window vent assembly of FIG. 6.
Figure 14:
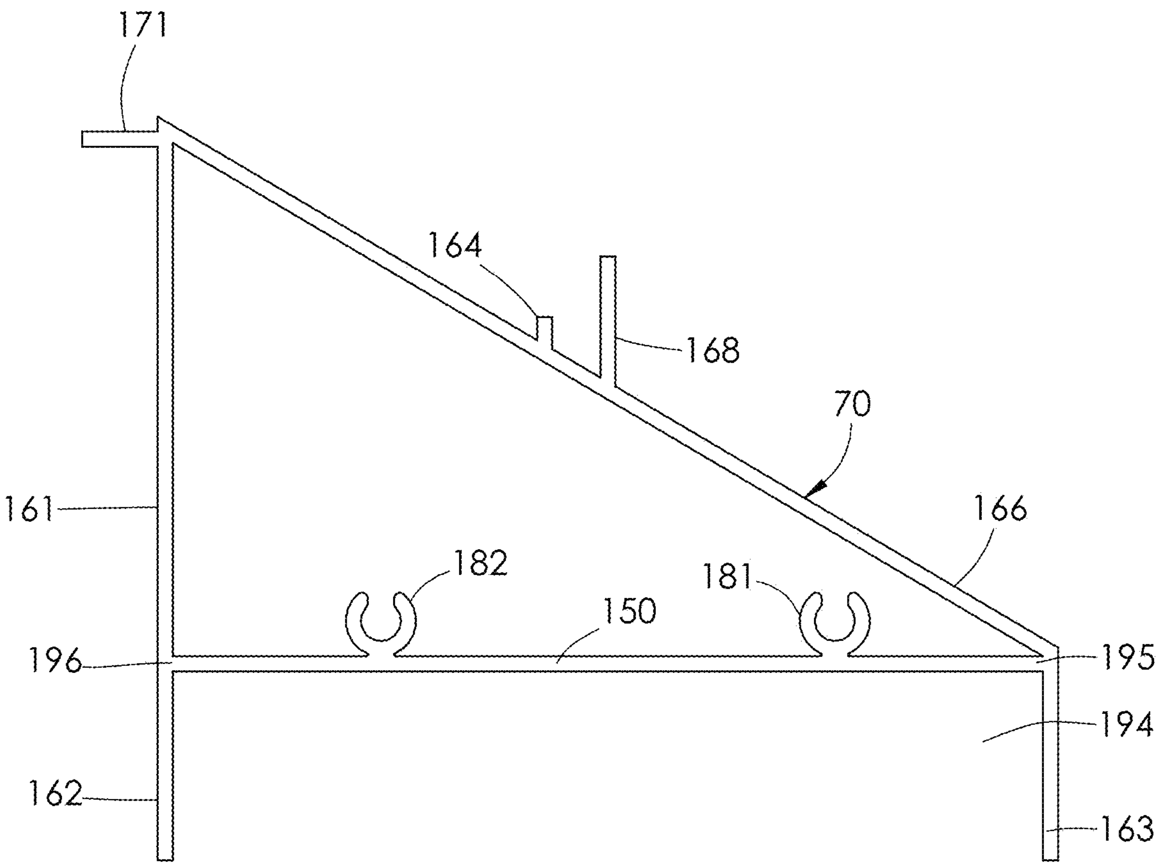
FIG. 14 is a cross-sectional view of the lower frame assembly of FIG. 13 taken along lines 14-14 in FIG. 13.
Figure 15:
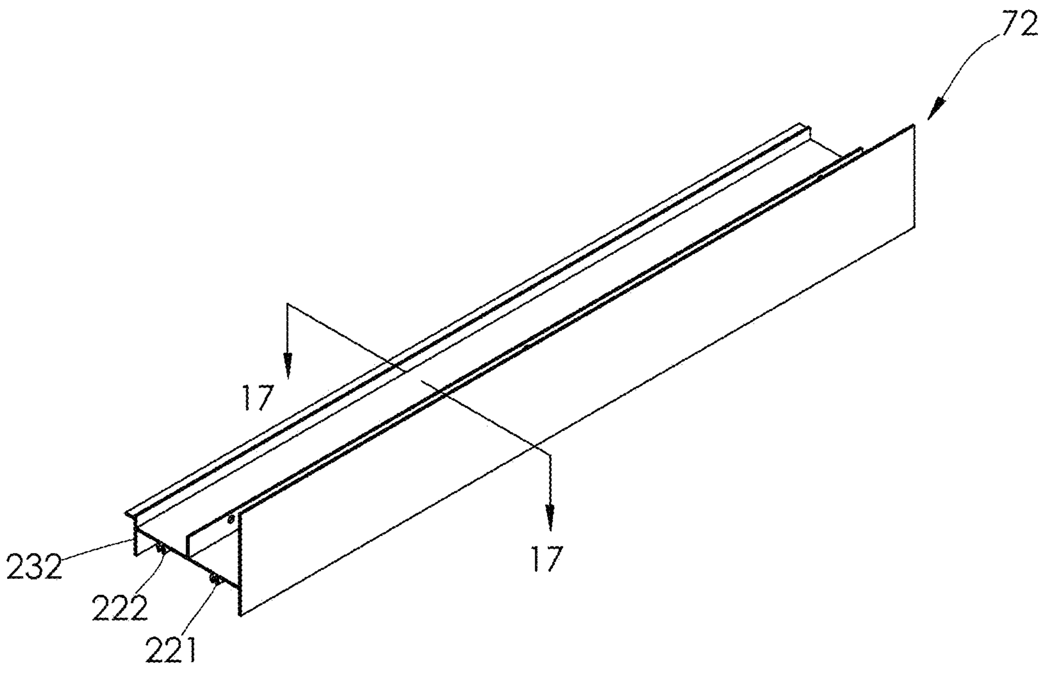
FIG. 15 is an isometric view of an upper frame assembly in the window vent assembly of FIG. 6.

Referring to FIGS. 5 and 14, the horizontal plate portion 150 has a first end 195 and a second end 196.

The first vertical plate portion 161 is coupled to the second end 196 of the horizontal plate portion 150 and extends upwardly from the horizontal plate portion 150. The first vertical plate portion 161 is vertically aligned with the second vertical plate portion 162.

The second vertical plate portion 162 is coupled to and extends downwardly from the second end 196 of the horizontal plate portion 150. The third vertical plate portion 163 is coupled to and extends downwardly from the first end 195 of the horizontal plate portion 150. The second and third vertical plate portions 162, 163 extend parallel to one another such that a space 194 is formed therebetween that is sized to receive a portion of the window frame 50 (e.g., upper frame portion 54) therein.

The slanted plate portion 166 is coupled to and extends from the first end 195 of the horizontal plate portion 150 to a top end of the first vertical plate portion 161.

The water blocking plate portion 168 is coupled to and extends upwardly from the slanted plate portion 166 within the interior region 145. The water blocking plate portion 168 blocks water/rain that has entered through the first air gap 141 from entering the second air gap 142. The water blocking plate portion 168 blocks the water/rain which then flows downwardly on the slanted plate portion 166 and out of the first air gap 141.

The fourth vertical plate portion 164 is coupled to and extends upwardly from the slanted plate portion 166 within the interior region 145 such that a screen receiving gap 184 is formed between the fourth vertical plate portion 164 and the water blocking plate portion 168.

The horizontal duct connection flange 171 extends outwardly and perpendicular from the first vertical plate portion 161 and communicates with the second air gap 142.

The first and second arcuate-shaped screw guides 181, 182 are coupled to the horizontal plate portion 150 and extend longitudinally along the horizontal plate portion 150, and are utilized to couple the first and second side plates 81, 82 to the lower frame assembly 70.

The first side 191 is coupled to the first side plate 81 which will be explained in greater detail below. Also, the second side 192 is coupled to the second side plate 82 which will be explained in greater detail below.

Upper Frame Assembly

Referring to FIGS. 5, 8 and 15-17, the upper frame assembly 72 is disposed above the lower frame assembly 70 to form the first air gap 141 and the second air gap 142 therebetween. The upper frame assembly 72 includes a horizontal wall portion 200, first, second, third, and fourth vertical wall portions 211, 212, 213, 214, a horizontal duct connection flange 216, first and second arcuate-shaped screw guides 221, 222, a first side 231 (shown in FIG. 16), and a second side 232 (shown in FIG. 15).

The horizontal wall portion 200 has a first end 241 and a second end 242 and extends parallel to the horizontal plate portion 150 of the lower frame assembly 70.

The first vertical wall portion 211 is coupled to and extends downwardly from the first end 241 of the horizontal wall portion 200 such that the first air gap 141 is formed between the first vertical wall portion 211 and a portion of the slanted plate portion 166 directly below the first vertical wall portion 211.

The second vertical wall portion 212 is coupled to and extends downwardly from the second end 242 of the horizontal wall portion 200 such that a second air gap 142 is formed between the second vertical wall portion 212 and a portion of the slanted plate portion 166 directly below the second vertical wall portion 242.

The third vertical wall portion 213 is coupled to and extends upwardly from the first end 241 of the horizontal wall portion 200. The first and third vertical wall portions 211, 213 are vertically aligned with one another.

The fourth vertical wall portion 214 is coupled to and extends upwardly from the second end 242 of the horizontal wall portion 200. The second and fourth vertical wall portions 212, 214 are vertically aligned with one another.

Referring to FIG. 5, the fifth vertical wall portion 215 is coupled to and extends downwardly from the horizontal wall portion 200 and is vertically aligned with the water blocking plate portion 168 of the lower frame assembly 70.

The horizontal duct connection flange 216 extends outwardly and perpendicular from the second vertical wall portion 212. The horizontal duct connection flange 216 communicates with the second air gap 142.

The first and second arcuate-shaped screw guides 221, 22 are coupled to the horizontal wall portion 200 and extend longitudinally along the horizontal wall portion 200, and are utilized to couple the first and second side plates 81, 82 to the upper frame assembly 72.

Figure 8:
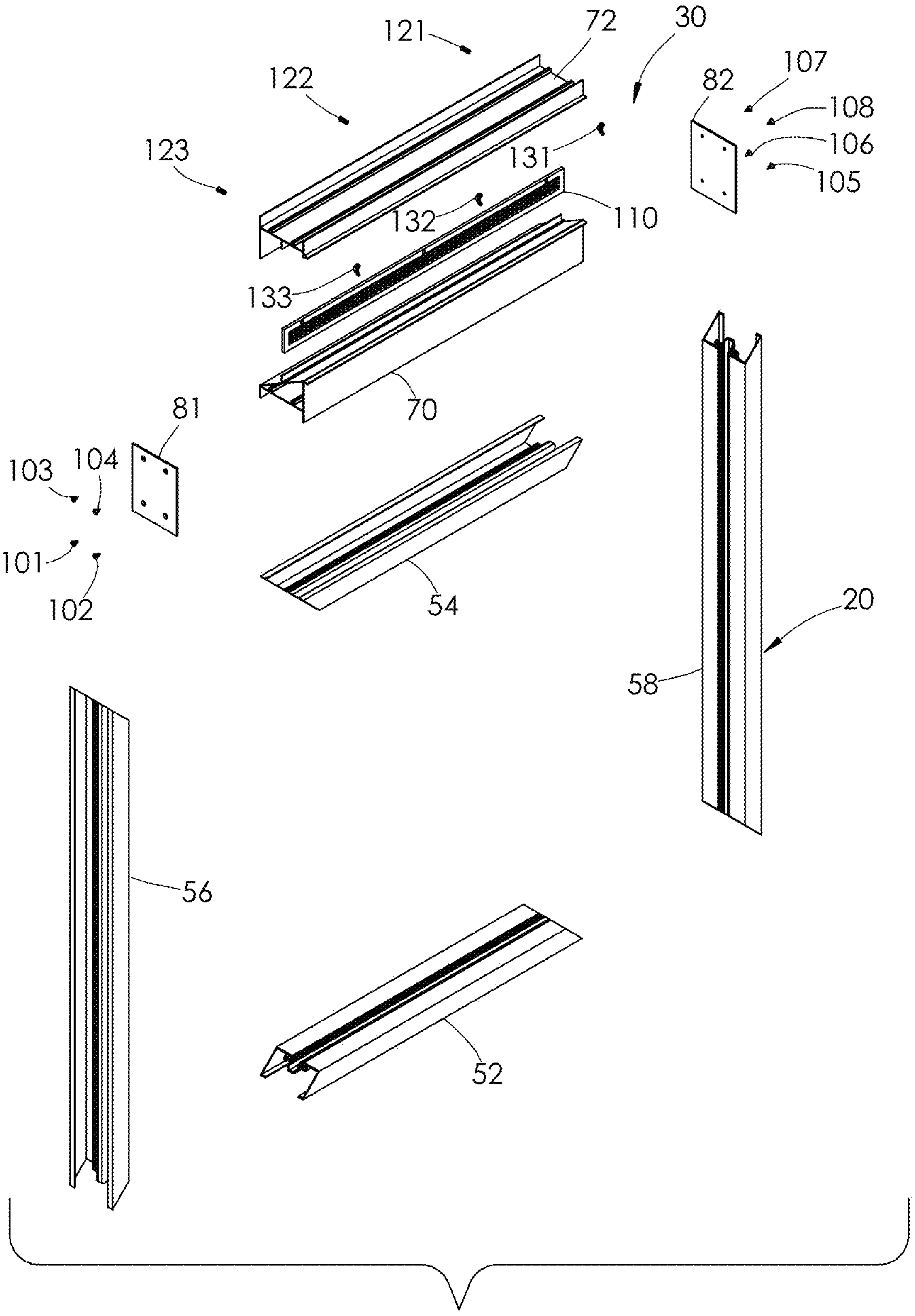
FIG. 8 is an exploded view of the window frame and the window vent assembly of FIG. 6.
Figure 9:
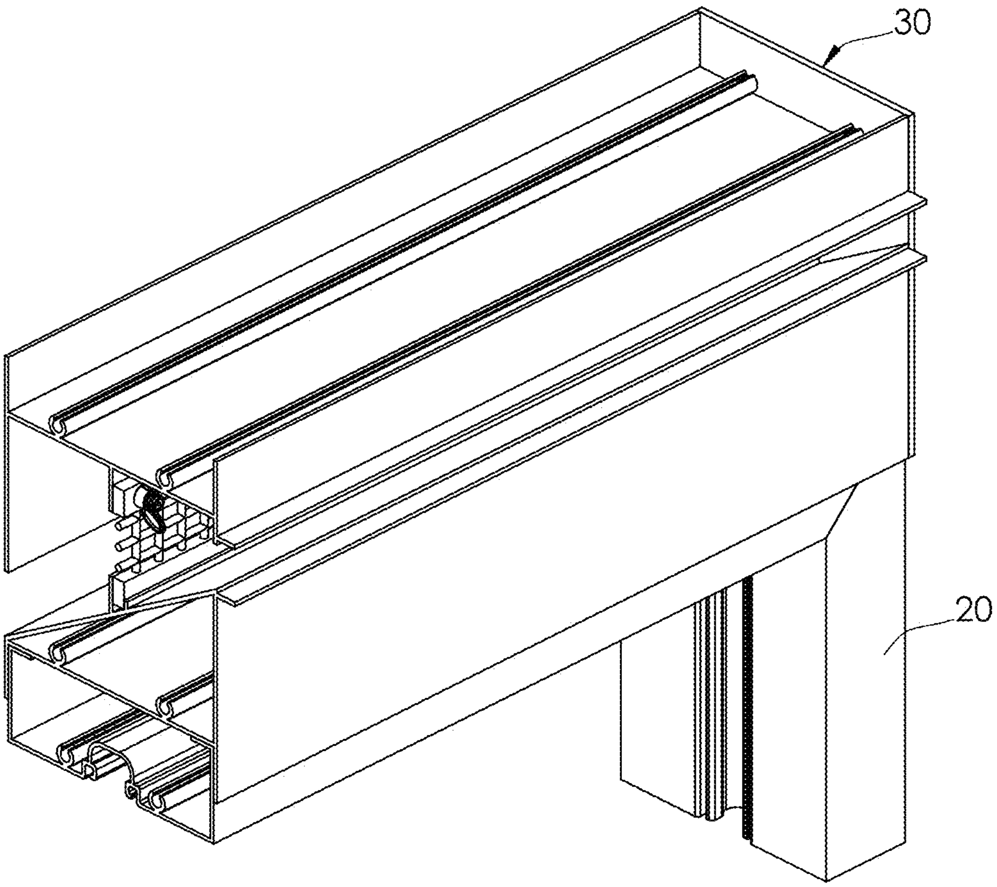
FIG. 9 is a cross-sectional view of the window frame and the window vent assembly of FIG. 6 taken along lines 9-9 in FIG. 6.
Figure 10:
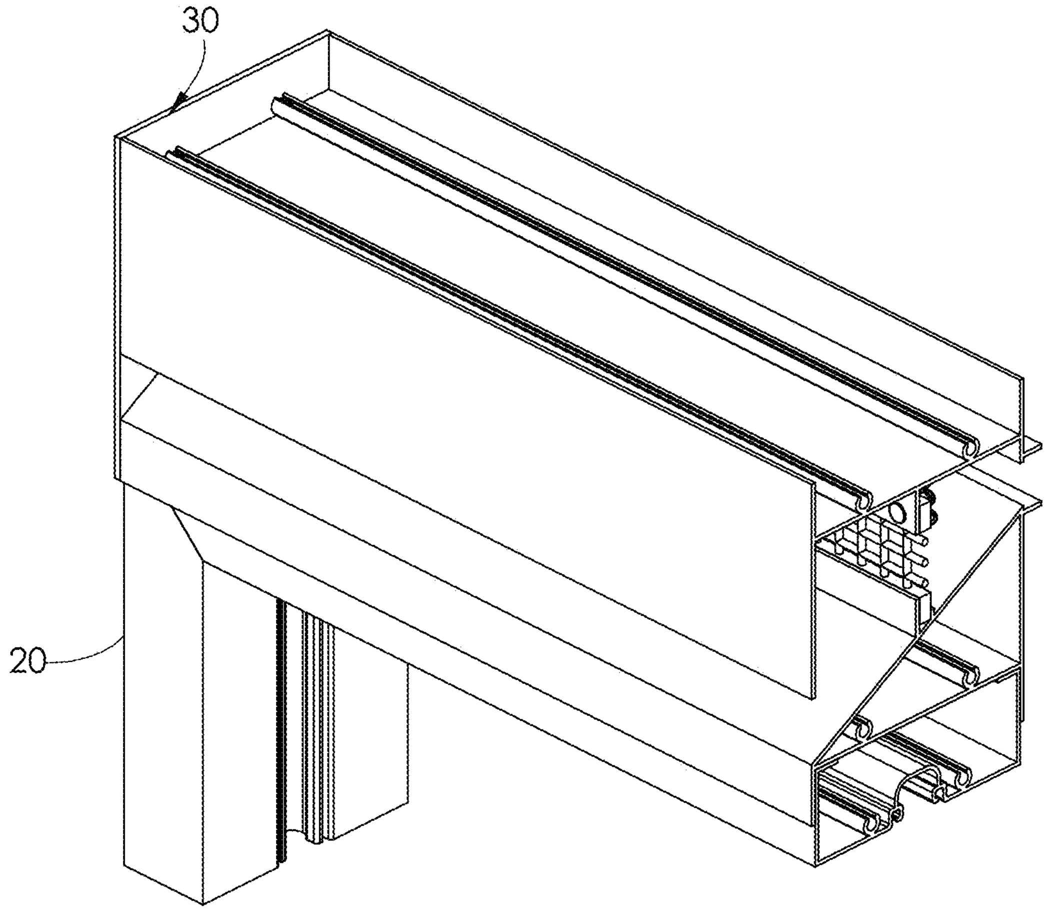
FIG. 10 is a cross-sectional view of the window frame and the window vent assembly of FIG. 6 taken along lines 10-10 in FIG. 6.
Figure 11:
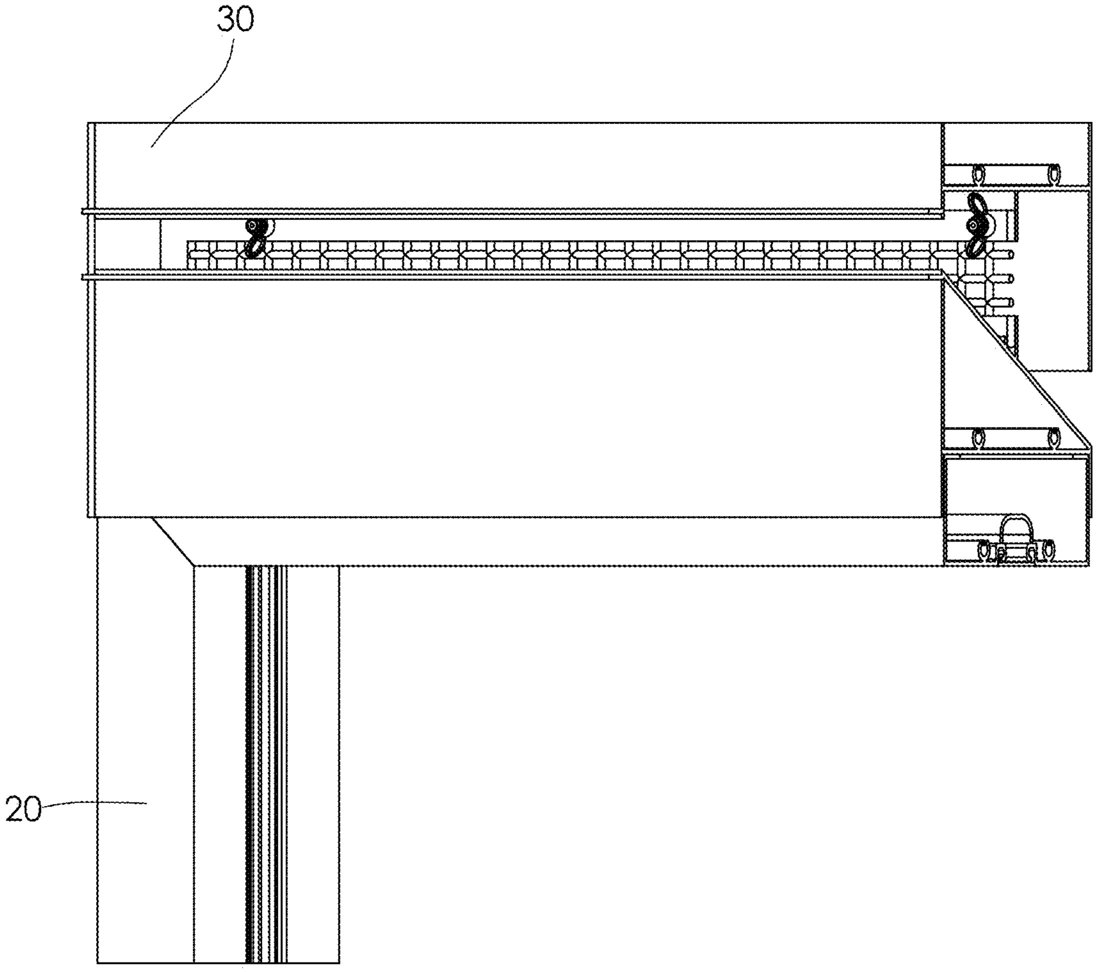
FIG. 11 is a cross-sectional view of the window frame and the window vent assembly of FIG. 6 taken along lines 11-11 in FIG. 6.
Figure 12:
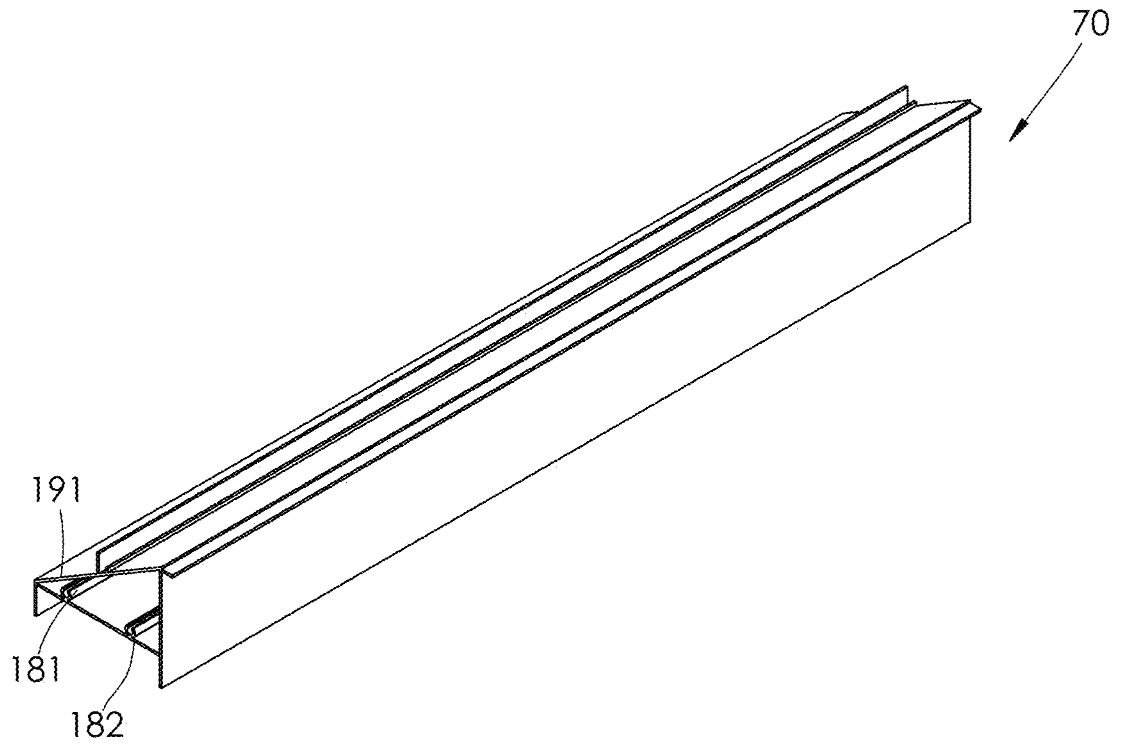
FIG. 12 is an isometric view of a lower frame assembly in the window vent assembly of FIG. 6.
Figure 13:
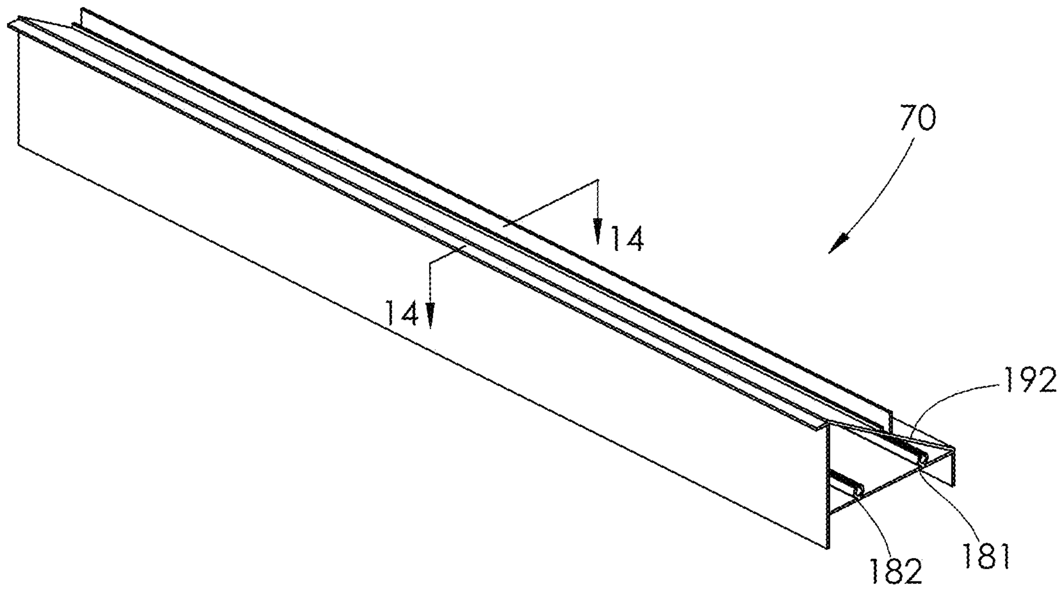
FIG. 13 is another isometric view of the lower frame assembly of FIG. 12.
Figure 16:
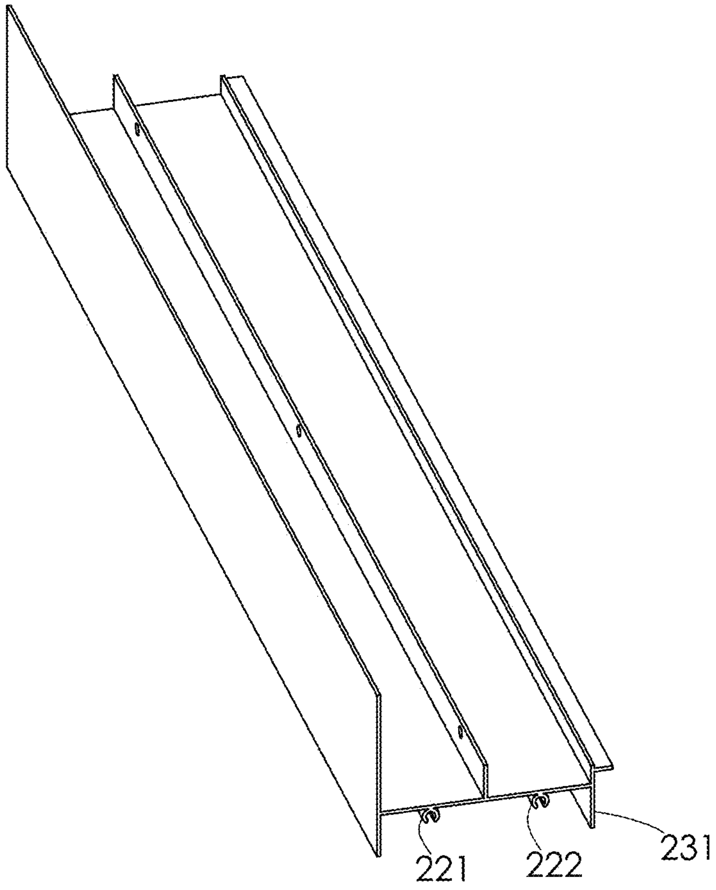
FIG. 16 is another isometric view of the upper frame assembly of FIG. 15.
Figure 17:
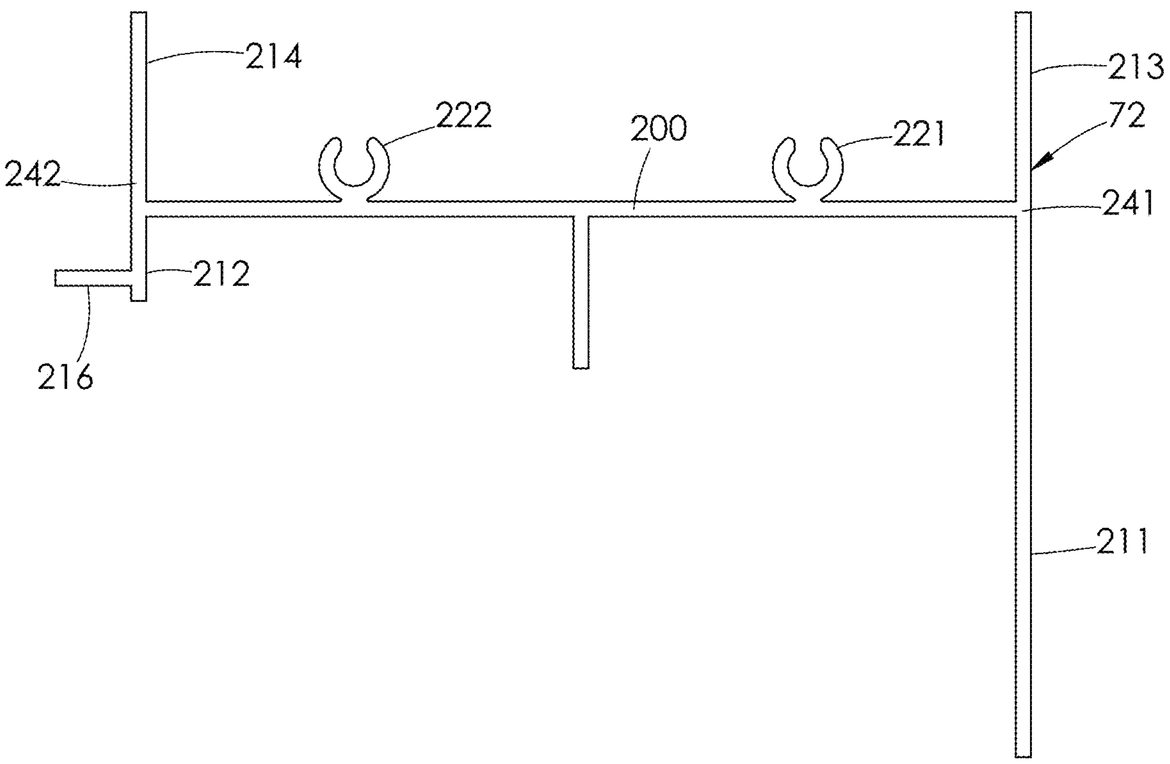
FIG. 17 is a cross-sectional view of the upper frame assembly of FIG. 15 taken along lines 17-17 in FIG. 15.

Referring to FIGS. 8 and 16, the first side 231 is coupled to the first side plate 81 which will be explained in greater detail below. Also, referring to FIGS. 8 and 15, the second side 232 is coupled to the second side plate 82 which will be explained in greater detail below.

First Side Plate

Figure 18:
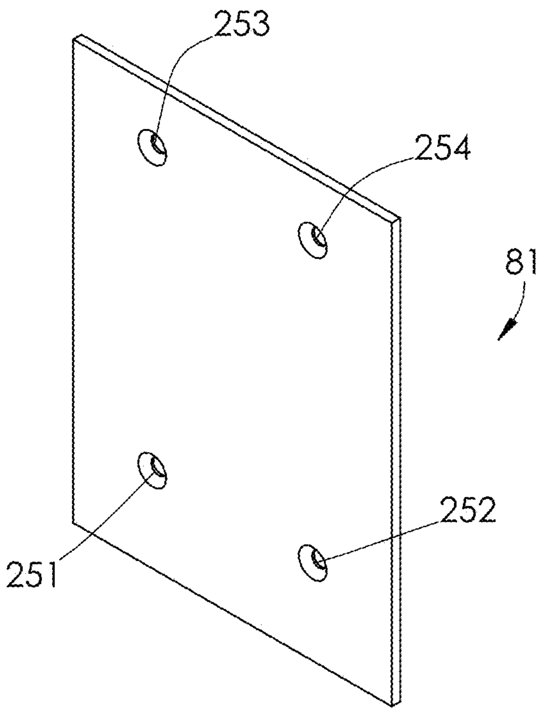
FIG. 18 is an isometric view of a first side plate utilized in the window vent assembly of FIG. 6.

Referring to FIGS. 5, 8 and 18, the first side plate 81 is coupled to the first side 191 (shown in FIG. 12) of the lower frame assembly 70 and the first side 231 (shown in FIG. 16) of the upper frame assembly 72. The first side plate 81 is rectangular-shaped and has first, second, third, and fourth apertures 251, 252, 253, 254 extending therethrough. The first and second screws 101, 102 extend through the first and second apertures 251, 252 in the first side plate 81 and into the first and second arcuate-shaped screw guides 181, 182 respectively of the lower frame assembly 70—to couple the first side plate 81 to the lower frame assembly 70. Further, the third and fourth screws 103, 104 extend through the third and fourth apertures 253, 254 in the first side plate 81 and into the first and second arcuate-shaped screw guides 221, 222 respectively of the upper frame assembly 72—to couple the first side plate 81 to the upper frame assembly 72.

Second Side Plate

Figure 19:
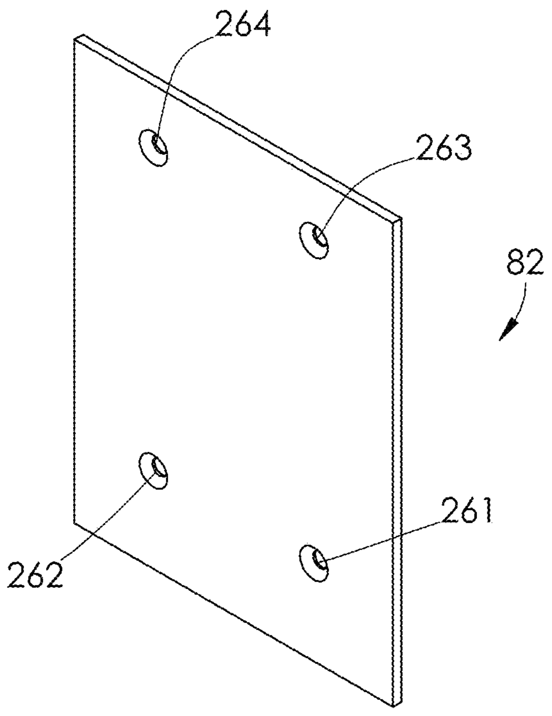
FIG. 19 is an isometric view of a second side plate utilized in the window vent assembly of FIG. 6.
Figure 20:
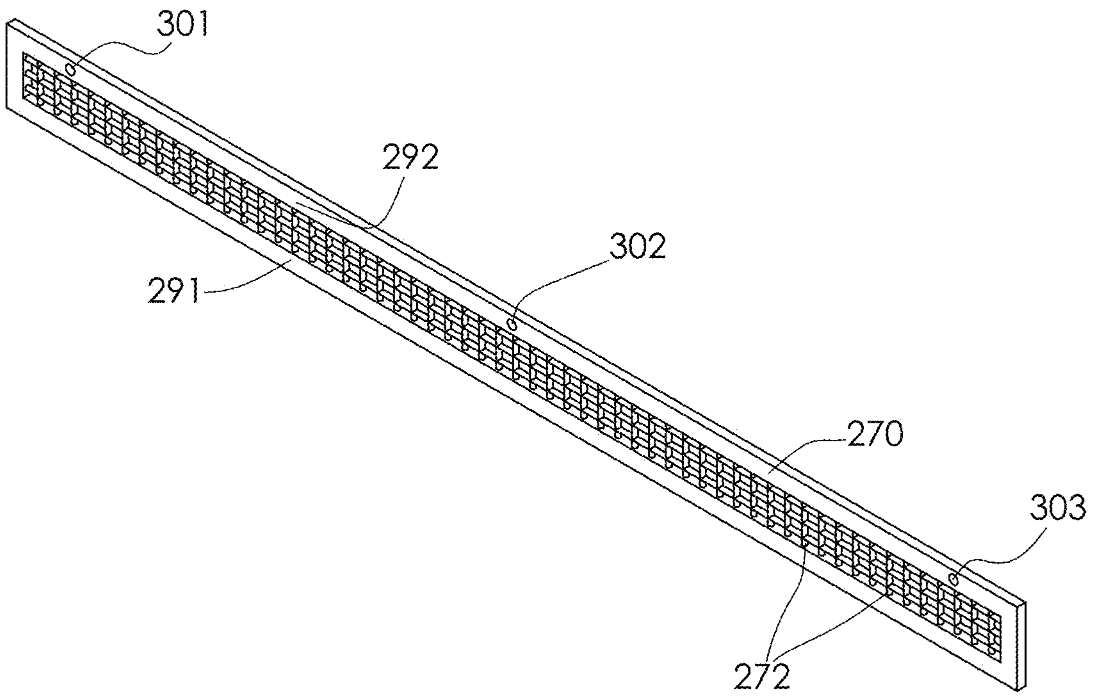
FIG. 20 is an isometric view of an insect screen assembly utilized in the window vent assembly of FIG. 6.

Referring to FIGS. 5, 8 and 19, the second side plate 82 is coupled to the second side 192 (shown in FIG. 13) of the lower frame assembly 70 and the second side 232 (shown in FIG. 15) of the upper frame assembly 72. The second side plate 82 is rectangular-shaped and has first, second, third, and fourth apertures 261, 262, 263, 264 extending therethrough. The fifth and sixth second screws 105, 106 extend through the first and second apertures 261, 262 in the second side plate 82 and into the first and second arcuate-shaped screw guides 181, 182 respectively of the lower frame assembly 70—to couple the second side plate 82 to the lower frame assembly 70. Further, the seventh and eighth screws 107, 108 extend through the third and fourth apertures 263, 264 in the second side plate 82 and into the first and second arcuate-shaped screw guides 221, 222 respectively of the upper frame assembly 72—to couple the second side plate 82 to the upper frame assembly 72.

In an alternative embodiment, the first and second side plates 81, 28 are not utilized. Instead, referring to FIGS. 2, 5 and 8, the first and second frame portions 56, 58 of the window frame 20 are extended upwardly to enclose end portions of the lower frame assembly 70 and the upper frame assembly 72. Further, the first and second screws 101, 102 extend through the first frame portion 56 and into the first and second arcuate-shaped screw guides 181, 182 respectively of the lower frame assembly 70—to couple the first frame portion 56 to the lower frame assembly 70. Also, the third and fourth screws 103, 104 extend through the first frame portion 56 and into the first and second arcuate-shaped screw guides 221, 222 respectively of the upper frame assembly 72—to couple the first frame portion 56 to the upper frame assembly 72. Further, the fifth and sixth second screws 105, 106 extend through the second frame portion 58 and into the first and second arcuate-shaped screw guides 181, 182 respectively of the lower frame assembly 70—to couple the second frame portion 58 to the lower frame assembly 70. Also, the seventh and eighth screws 107, 108 extend through the second frame portion 58 and into the first and second arcuate-shaped screw guides 221, 222 respectively of the upper frame assembly 72—to couple the second frame portion 58 to the upper frame assembly 72.

Insect Screen Assembly

Referring to FIGS. 5, 8-11 and 20, the insect screen assembly 110 is provided to prevent insects and debris from passing from the interior region 145 through the second air gap 142. The insect screen assembly 110 has an outer frame 270 and a metal screen 272. The metal screen 272 is coupled to and disposed within the outer frame 270. The outer frame 270 is rectangular-ring shaped and has a lower frame portion 291 and an upper frame portion 292. The lower frame portion 291 is disposed in the screen receiving gap 184. The upper frame portion 292 is disposed against the fifth vertical wall portion 215 of the upper frame assembly 72. The upper frame portion 292 has apertures 301, 302, 303 extending therethrough. The first, second, and third bolts 121, 122, 123 extend through the apertures 301, 302, 303 respectively and through respective apertures in the fifth vertical wall portion 215 (not shown). The first, second, and third bolts 121, 122, 123 are coupled to first, second, and third wingnuts 131, 132, 133 respectively to couple the insect screen assembly 110 to the upper frame assembly 72.

In an alternative embodiment, the lower frame assembly 70 and the upper frame assembly 72 can each be manufactured with an integral thermal brake separation member constructed of a non-heat conducting material similar to a thermal brake separation member utilized in a thermally-broken window frame.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A window vent assembly, comprising:

a lower frame assembly having a horizontal plate portion, a first vertical plate portion, and a slanted plate portion;

the horizontal plate portion having a first end and a second end;

the first vertical plate portion being coupled to the second end of the horizontal plate portion and extending upwardly from the horizontal plate portion;

the slanted plate portion being coupled to and extending from the first end of the horizontal plate portion to a top end of the first vertical plate portion;

an upper frame assembly having a horizontal wall portion, a first vertical wall portion, and a second vertical wall portion;

the first vertical wall portion being coupled to and extending downwardly from a first end of the horizontal wall portion such that a first air gap is formed between the first vertical wall portion and the slanted plate portion; and the second vertical wall portion being coupled to and extending downwardly from a second end of the horizontal wall portion such that a second air gap is formed between the second vertical wall portion and the slanted plate portion.

2. The window vent assembly of claim 1, further comprising:

a first side plate being coupled to a first side of the lower frame assembly and a first side of the upper frame assembly; and a second side plate being coupled to a second side of the lower frame assembly and a second side of the upper frame assembly such that an interior region is formed between the lower frame assembly and the upper frame assembly.

3. The window vent assembly of claim 1, wherein:

the lower frame assembly and the upper frame assembly route air through the first air gap, an interior region, and the second air gap, wherein the first air gap is formed between a lowermost end of the first vertical wall portion and the slanted plate portion and the second air gap is formed between a lowermost end of the second vertical wall portion and the slanted plate portion, wherein the lowermost end of the first vertical wall is lower than the lowermost end of the second vertical wall.

4. The window vent assembly of claim 1, wherein:

the lower frame assembly further having a second vertical plate portion and a third vertical plate portion; the second vertical plate portion being coplanar with the first vertical plate portion;

the second vertical plate portion being coupled to and extending downwardly from the second end of the horizontal plate portion; and the third vertical plate portion being coupled to and extending downwardly from the first end of the horizontal plate portion; the second and third vertical plate portions extending parallel to one another such that a space is formed therebetween that is sized to receive a portion of a window frame therein.

5. The window vent assembly of claim 4, wherein:

the lower frame assembly further includes a first horizontal duct connection flange extending outwardly from the third vertical plate portion, the first horizontal duct connection flange communicating with the second air gap; and the upper frame assembly further includes a second horizontal duct connection flange extending outwardly from the second vertical wall portion, the second horizontal duct connection flange communicating with the second air gap.

6. The window vent assembly of claim 5, wherein:

the upper frame assembly further includes a third vertical wall portion and a fourth vertical wall portion;

the third vertical wall portion being coupled to and extending upwardly from the first end of the horizontal wall portion; the first and third vertical wall portions being aligned with one another; and the fourth vertical wall portion being coupled to and extending upwardly from the second end of the horizontal wall portion, the second and fourth vertical wall portions being aligned with one another.

7. The window vent assembly of claim 6, wherein:

the lower frame assembly further includes a water blocking plate portion, the water blocking plate portion being coupled to and extending upwardly from the slanted plate portion.

8. The window vent assembly of claim 7, wherein:

the lower frame assembly further includes a fourth vertical plate portion being coupled to and extending upwardly from the slanted plate portion such that a screen receiving gap is formed between the fourth vertical plate portion and the water blocking plate portion;

the upper frame assembly further includes a fifth vertical wall portion being coupled to and extending downwardly from the horizontal wall portion, the fifth vertical wall portion having an aperture extending therethrough;

an insect screen assembly having a lower frame portion and an upper frame portion, the lower frame portion being disposed in the screen receiving gap, the upper frame portion being disposed against the fifth vertical wall portion; and a bolt being disposed through the insect screen assembly and the aperture in the fifth vertical wall portion to couple the insect screen assembly to the upper frame assembly.

9. The window vent assembly of claim 1, wherein:

the lower frame assembly further includes first and second arcuate-shaped screw guides coupled to the horizontal plate portion.

10. The window vent assembly of claim 9, wherein:

the upper frame assembly further includes first and second arcuate-shaped screw guides coupled to the horizontal wall portion.

11. The window vent assembly of claim 10, further comprising:

a first side plate being coupled to the first side of the lower frame assembly utilizing first and second screws, the first and second screws extending through the first side plate into the first and second arcuate-shaped screw guides respectively of the lower frame assembly; and the first side plate being further coupled to the first side of the upper frame assembly utilizing third and fourth screws, the third and fourth screws extending through the first side plate into the first and second arcuate-shaped screw guides respectively of the upper frame assembly.

12. A window vent assembly, comprising:

a lower frame assembly having a first vertical plate portion, and a slanted plate portion;

an upper end portion of the slanted plate portion being coupled to and extending downward from a top end of the first vertical plate portion;

an upper frame assembly having a horizontal wall portion, a first vertical wall portion, and a second vertical wall portion;

the first vertical wall portion being coupled to and extending downwardly from a first end of the horizontal wall portion such that a first air gap is formed between the first vertical wall portion and the upper end portion of the slanted plate portion; and the second vertical wall portion being coupled to and extending downwardly from a second end of the horizontal wall portion such that a second air gap is formed between the second vertical wall portion and a lower end portion of the slanted plate portion.

13. The window vent assembly of claim 12, wherein:

the lower frame assembly further includes a first horizontal duct connection flange extending outwardly below the second air gap; and the upper frame assembly further includes a second horizontal duct connection flange extending outwardly above the second air gap.

14. The window vent assembly of claim 13, wherein:

the lower frame assembly further having a second vertical plate portion and a third vertical plate portion; the second vertical plate portion being coplanar with the first vertical plate portion; and the second and third vertical plate portions extending parallel to one another such that a space is formed therebetween that is sized to receive a portion of a window frame therein.

* * * * *